(12) United States Patent
Poggiolini

(10) Patent No.: US 6,621,617 B1
(45) Date of Patent: Sep. 16, 2003

(54) DISPLACED-BIAS INTERFEROMETER-DETECTION (DB/ID) MODULATION

(75) Inventor: Pierluigi Poggiolini, Turin (IT)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 10/132,007

(22) Filed: Apr. 25, 2002

(51) Int. Cl.[7] .................. G02F 1/01; G02F 1/035; H04B 10/04
(52) U.S. Cl. ............... 359/279; 359/237; 359/181; 359/183; 359/245; 359/246; 385/3; 385/9
(58) Field of Search .................. 359/237, 238, 359/245, 246, 122, 179, 279, 180, 181, 183; 385/2, 3, 9, 24

(56) References Cited

U.S. PATENT DOCUMENTS

| | | | |
|---|---|---|---|
| 5,543,952 A | 8/1996 | Yonenaga et al. | 359/181 |
| 5,974,209 A * | 10/1999 | Cho et al. | 385/3 |
| 6,028,695 A * | 2/2000 | Uemura et al. | 359/279 |
| 6,334,004 B1 * | 12/2001 | Ohkuma et al. | 385/9 |
| 6,341,031 B1 * | 1/2002 | McBrien et al. | 359/237 |

FOREIGN PATENT DOCUMENTS

EP      1202476      5/2002    ......... H04B/10/155

OTHER PUBLICATIONS

D. Penninckx, et al. "Experimental Verification of the Phase–Shaped Binary Transmission (PSBT) Effect," IEEE Photonics Technology Letters, vol. 10, No. 4, Apr. 1998, pp. 612–614.

D. Penninckx, et al. "The Phase–Shaped Binary Transmission (PSBT): A new technique to Transmit Far Beyond the Chromatic Dispersion Limit," IEEE Photonics Technology Letters, vol. 9, No. 2, Feb. 1997, pp. 259–261.

* cited by examiner

Primary Examiner—Loha Ben
(74) Attorney, Agent, or Firm—Ritter, Lang & Kaplan LLP

(57) ABSTRACT

A Mach-Zehnder interferometer is employed to implement phase modulation of an optical signal. The interferometer is biased at its maximum extinction point. The modulated optical signal may have a peak magnitude between approximately 30% and 80% of a maximum output power of the interferometer.

18 Claims, 5 Drawing Sheets

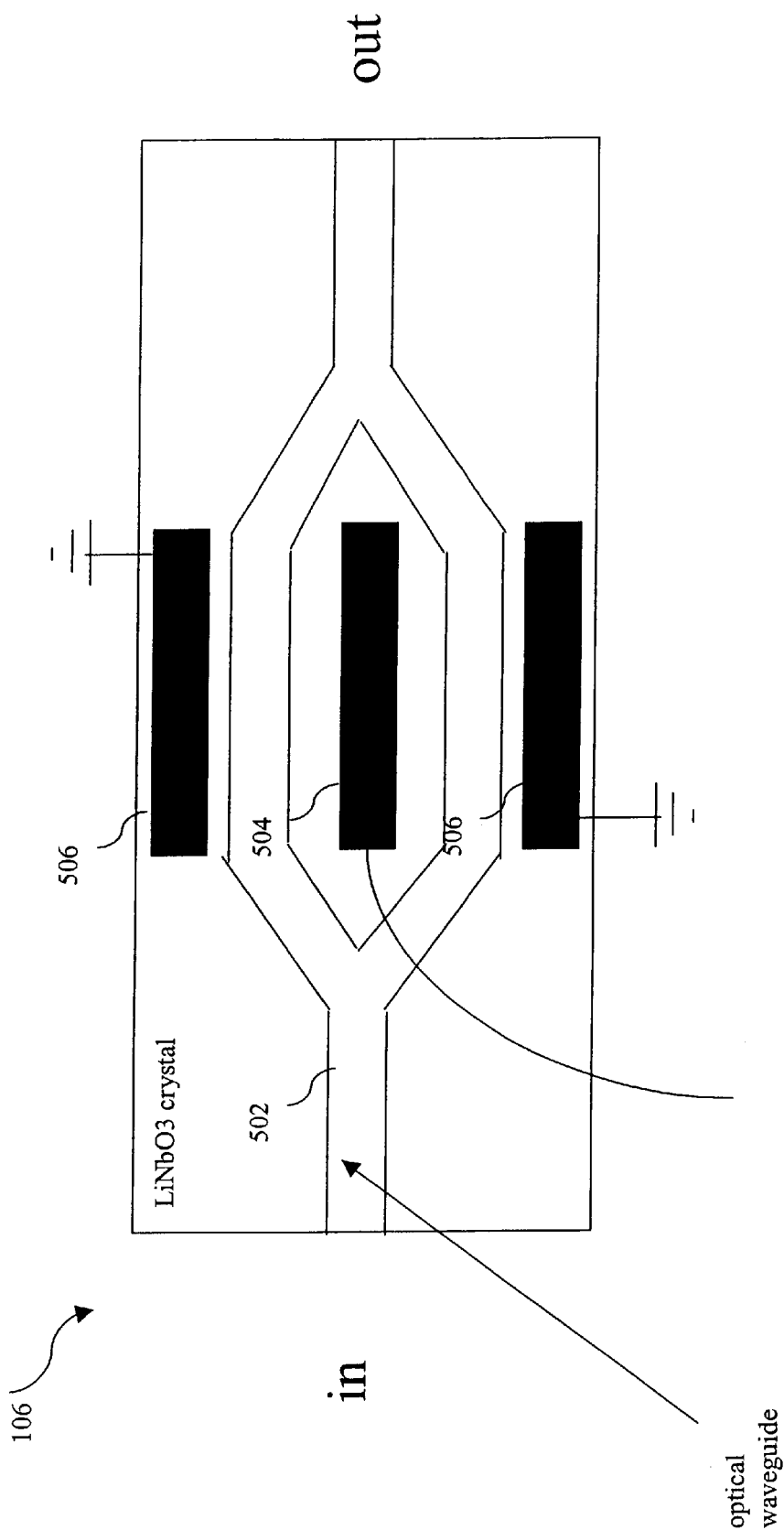

DISPLACED-BIAS INTERFEROMETER-DETECTION (DB/ID) MODULATION

BACKGROUND OF THE INVENTION

In one embodiment, the present invention relates to optical transmission systems and more particularly to systems and methods for modulation.

In order to accommodate increasing demands from Internet traffic, optical communication links are evolving to carry higher and higher data rates over greater and greater distances. Wavelength division multiplexed (WDM) links are being developed to carry greater numbers of more densely spaced channels.

There are, however, obstacles to the further development of high capacity, long haul WDM transmission systems. Despite the use of advanced chromatic dispersion compensation techniques, residual uncompensated chromatic dispersion may still be present on certain WDM channels at the receiver, causing unwanted intersymbol interference. High data rate broadband modulation used over long distances is very susceptible to amplified stimulated emission (ASE) noise, which can cause receiver errors.

At the transmitter end, it becomes difficult to provide modulator and transmitter electronics with sufficient electrical bandwidth, peak to peak voltage swing, and slew rate to support increased data rates, e.g., greater than 10 Gbps. In order to overcome receiver susceptibility to noise, power levels may be increased. This exacerbates unwanted non-linear effects such as four-wave mixing, cross phase modulation and Raman crosstalk.

Yet another problem is posed by limited optical bandwidth. Optical bandwidth has been customarily viewed as being unlimited. Nonetheless, as the number of channels increases, the inter-channel spacing decreases and the bandwidths of the modulated signal increase as a result of increased data rates. The result is that co-channel interference becomes a concern.

The use of a LiNbO$_3$-based device to provide phase modulation instead of the more widespread amplitude modulation has been proposed as a tool with which to address some of the above problems. This phase modulation scheme does not, however, substantially improve chromatic dispersion performance.

What are needed are systems and methods for practically implementing phase modulation in an optical digital transmission system to help address the above-identified obstacles to the further development of long-haul high data rate optical communication links, and in particular to address the problem of tolerance to chromatic dispersion.

SUMMARY OF THE INVENTION

By virtue of one embodiment of the present invention, a Mach-Zehnder interferometer is employed to implement phase modulation of an optical signal. The interferometer is biased at its maximum extinction point. The modulated optical signal may have a peak magnitude between approximately 30% and 80% of a maximum output power of the interferometer.

A first aspect of the present invention provides a method of phase modulating an optical signal. The method includes: driving a Mach-Zehnder interferometer with a data signal biased at a level approximately equal to a maximum extinction point of the Mach-Zehnder interferometer, and outputting the optical signal, phase modulated by the data signal, from the Mach-Zehnder interferometer.

A second aspect of the present invention provides apparatus for phase modulating an optical signal. The apparatus includes a Mach-Zehnder interferometer having a modulation drive input and a modulation driver that provides a data signal to the modulation drive input, the data signal being biased to a level approximately equal to a maximum extinction point of the Mach-Zehnder interferometer. The Mach-Zehnder interferometer outputs the optical signal as phase modulated by the data signal.

Further understanding of the nature and advantages of the inventions herein may be realized by reference to the remaining portions of the specification and the attached drawings.

BRIEF DESCRIPTION OF THE DRAWINGS

FIG. 5 depicts a Mach-Zehnder modulator as may be used in one embodiment of the present invention.

DESCRIPTION OF SPECIFIC EMBODIMENTS

The present invention may find application in, for example, optical digital transmission systems. Phase modulation may be advantageously implemented by employing a Mach-Zehnder optical interferometer biased at its maximum extinction point rather than at its 3 dB-point, as would be done in conventional amplitude modulation schemes. This provides a practical implementation of an optical phase modulation transmitter.

Figure 1:
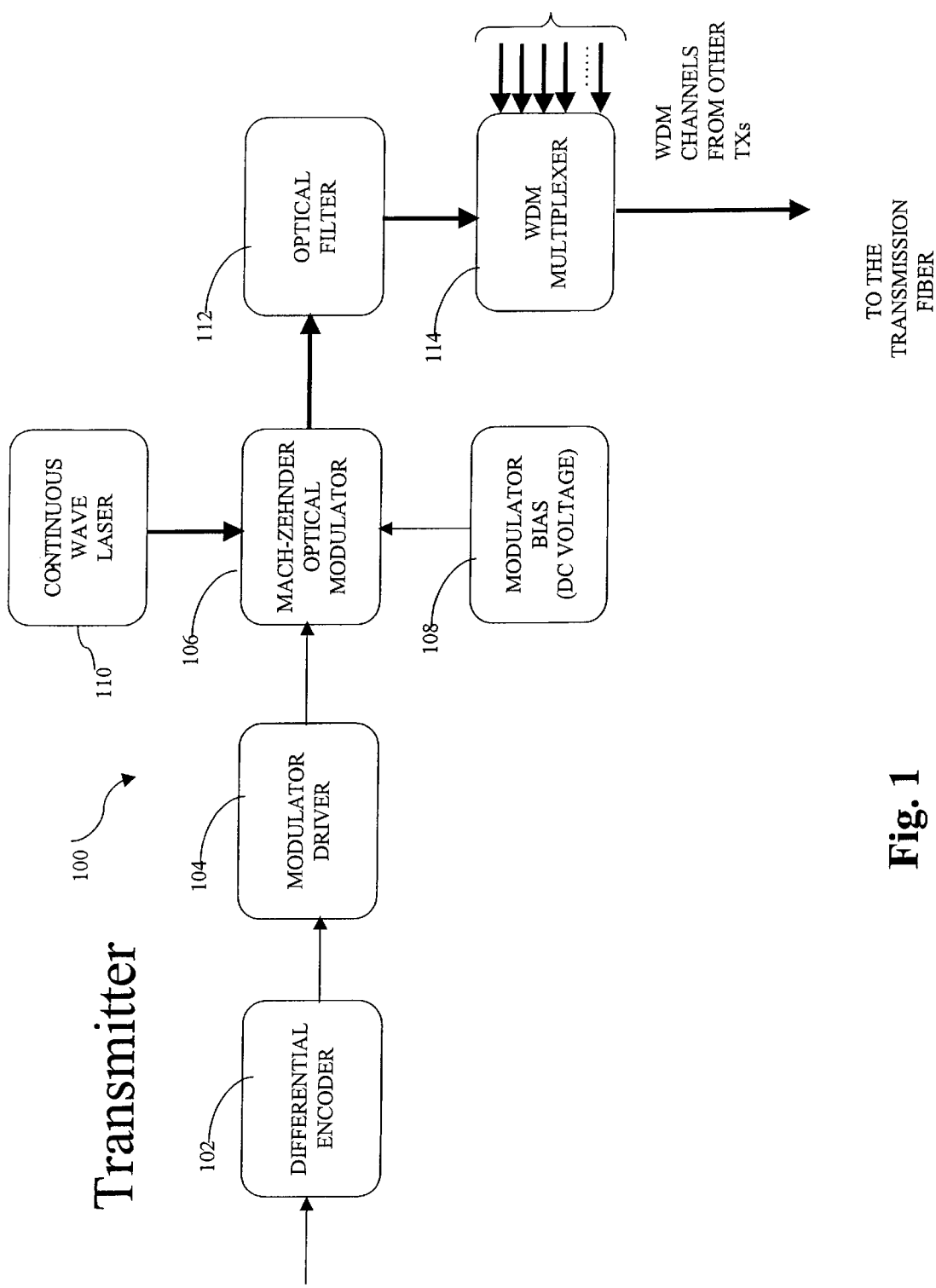
FIG. 1 depicts an optical transmitter according to one embodiment of the present invention.

FIG. 1 depicts an optical transmitter according to one embodiment of the present invention. Optical transmitter 100 acts as a type of differential phase shift keying (DPSK) transmitter but with different modulation characteristics. The differences between the present scheme and conventional phase shift keying techniques are further clarified below in reference to FIG. 4. Data is input to a differential encoder 102 that applies differential coding to the data to be transmitted. Additionally, there may be forward error correction coding (FEC) as known in the art to provide further robustness in the presence of noise. The differentially encoded data is input to a modulator driver 104 that will develop an analog modulation drive signal as described below with reference to FIG. 3.

The modulation drive signal is applied to the input of a Mach-Zehnder optical interferometer 106 that is configured to operate as a modulator. A modulation bias is also applied to interferometer 106 by a modulator bias source 108. According to one embodiment of the present invention, interferometer 106 is biased at its maximum extinction point, i.e., the modulation level corresponding to the minimum amplitude output of the modulator. The optical signal to be modulated is provided by a continuous wave laser 110. Further shaping of the output spectrum may be provided by an optical filter 112 having a center frequency at the operating frequency of laser 110, the desired center of the modulated optical waveform.

A WDM multiplexer 114 combines the phase modulated optical signal with other optical signals on other wavelengths as are provided by other transmitters. The output of multiplexer 114 is a WDM signal combining all of these WDM channels on the same fiber.

Figure 3:
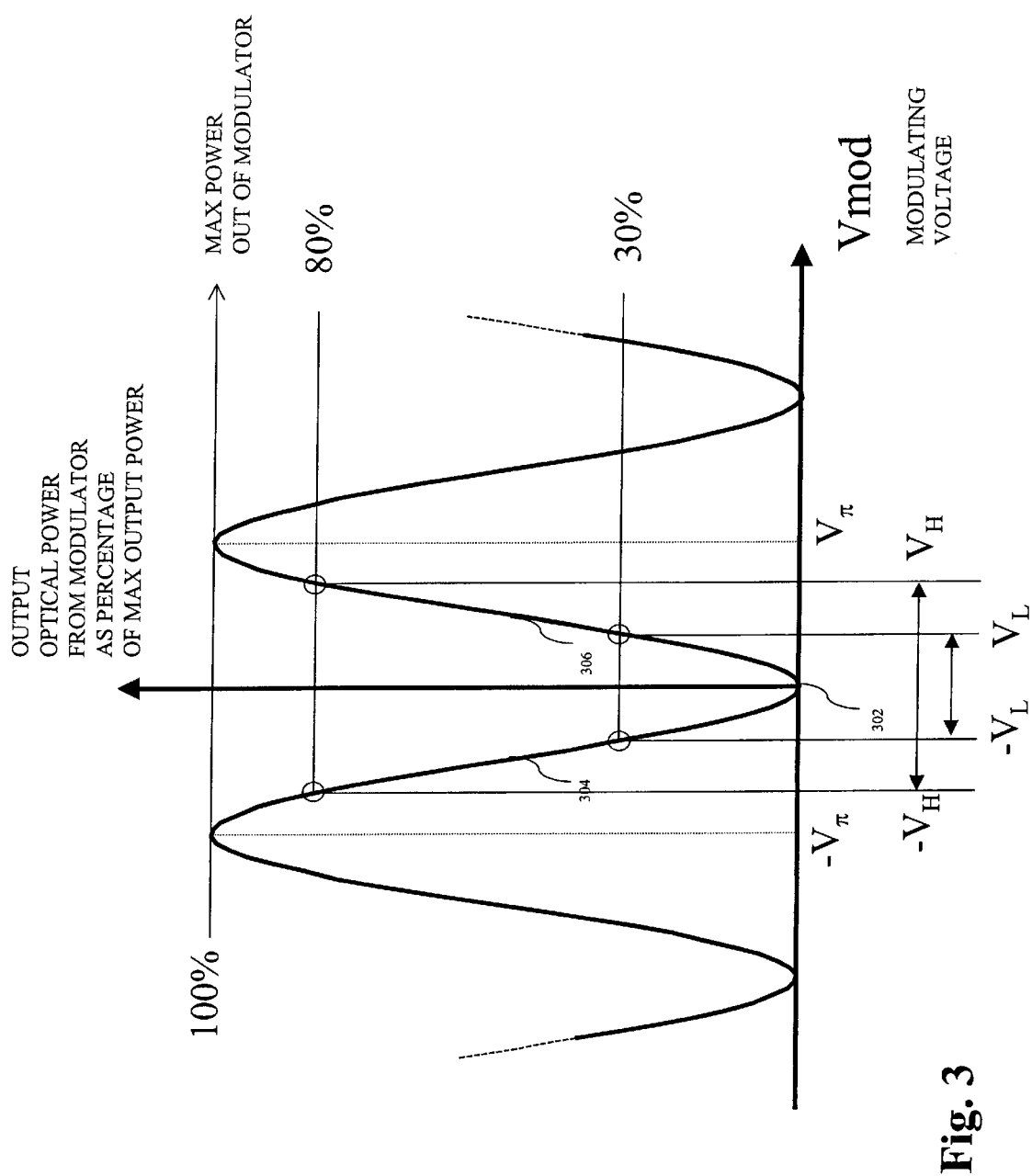
FIG. 3 depicts output amplitude versus input modulation level for a Mach-Zehnder optical interferometer as would be used in modulation according to one embodiment of the present invention.

Referring now to FIGS. 3, a modulation scheme according to one embodiment of the present invention will now be described in greater detail. The horizontal axis of the graph of FIG. 3 represents total input modulation voltage including the bias provided by block 108 and the drive voltage provided by modulator driver 104. The vertical axis represents the output power level of the modulator. In a scheme referred to as intensity modulation/direct detection (IM/DD) a Mach-Zehnder interferometer may be used to perform amplitude modulation by biasing the interferometer at a modulation voltage $V_{mod}$ at a point corresponding to 50% of the maximum output power level. In this scheme, a "1" may be transmitted by applying the modulation voltage corresponding to the maximum power with a "0" being transmitted by applying the modulation voltage corresponding to the minimum power output.

By contrast, in accordance with one embodiment of the present invention, the modulation voltage is biased at the maximum extinction point of the modulator, i.e., point 302 in FIG. 3. In response to the differentially encoded data, the total modulation voltage varies between, e.g., points 304 and 306 through point 302. As can be seen, both of these modulation levels correspond to approximately 50% of maximum modulator output power. However, the positive and negative modulation voltages cause opposite output phases, thus achieving phase modulation of the optical signal by employing the interferometer structure normally employed for amplitude modulation.

In one embodiment, point 304, corresponding to, e.g., a digital "0" is between $-V_H$ (80% of maximum modulator output power) and $-V_L$ (30% of maximum modulator output power) while point 306, corresponding to a digital "1" may be between $V_L$ (30% of maximum modulator output power) and $V_H$ (80% of maximum output power).

The peak-to-peak swing of the electrical modulating waveform is essentially similar to that of the IM/DD technique. Since the receive end uses an interferometer for detection, this technique may be referred to as "Displaced-Biased Interferometer-Detection" (DB/ID).

FIG. 5 depicts details of the internal structure of Mach-Zehnder modulator 106. Coherent light to be modulated is fed through a split waveguide structure 502 in a $LiNbO_3$ crystal. A modulation voltage is applied to electrode 504 relative to ground electrodes 506. The electrodes may be implemented as traveling wave structures. Application of the modulation voltage induces a phase difference between the two arms of waveguide structure 502. Amplitude modulation results from variation in the modulation voltage and is caused by constructive or destructive interference of light in the two arm outputs. A type of phase modulation results when the sign of the modulation voltage changes in response to the data. Depending on the crystal geometry, other electrode configurations may be substituted. A representative implementation of modulator 106 is available from JDS Uniphase, for example.

Transmission channel components such as intermediate optical amplifiers may be similar to those used for IM/DD, except that certain parameters may have different optima for DB/ID. For example, it may be necessary to employ a different distribution of chromatic dispersion compensation along the link.

Figure 2:
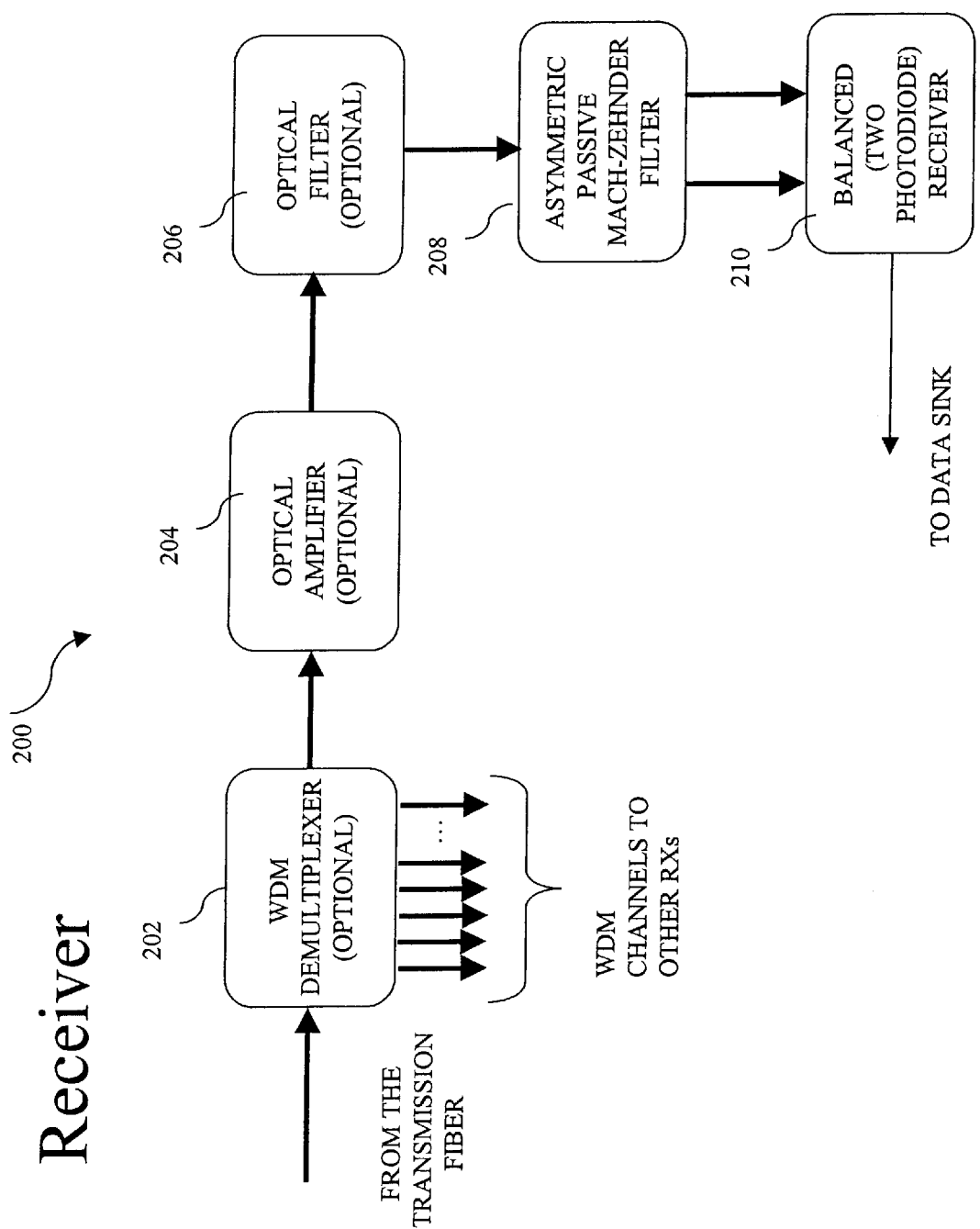
FIG. 2 depicts an optical receiver as would be used to recover data from the signal generated by the transmitter of FIG. 1.

FIG. 2 depicts an optical receiver 200 that may be used to recover data from the optical signal generated by the transmitter of FIG. 1. Receiver 200 optionally includes a DWM demultiplexer 202 for isolating a particular WDM wavelength from a composite WDM signal received from the transmission fiber. Other channels are forwarded to other receivers. An optional optical amplifier 204 amplifies the received optical signal to a desired level. Further spectral shaping of the received signal is provided by an optional optical filter 206.

The filter output signal is input to an asymmetric passive Mach-Zehnder filter 208. This filter is an interferometer that incorporates a symmetric splitter, two waveguides of unequal length, and a two-input, two-output optical coupler. The unequal length waveguides are configured to apply a differential delay such that the delay of one branch differs by approximately one symbol period, i.e., the inverse of the bit rate, from the delay of the other branch. This differential delay can be field optimized.

A balanced receiver 210 incorporates two photo diodes to recover the differential data present on the two optical outputs of filter 208. The optical phase difference at the two inputs of the optical coupler should be adjusted to be equal to an integer multiple of $\pi$, plus $\pi/2$. This adjustment may be achieved by temperature tuning of the interferometer. Other tuning techniques may be used depending on the particular interferometer technology used. It will be appreciated that differential decoding is accomplished inherently by the structure of receiver 200.

The disclosed DB/ID scheme provides numerous advantages. For example, improved tolerance to chromatic dispersion is provided. Compared to IM/DD techniques using NRZ coding, the tolerance to chromatic dispersion is approximately 2.5 times better. For a 40 Gbps signal, the 3-dB penalty dispersion tolerance for DB/ID is approximately +/−150 ps/nm whereas the tolerance of NRZ IM/DD is approximately +/−60 ps/nm. This greater tolerance to chromatic dispersion allows long-haul WDM systems to be designed with substantially relaxed requirements for chromatic dispersion compensation accuracy. This is particularly advantageous at high data rates such as, e.g., 40 Gbps.

Figure 4:
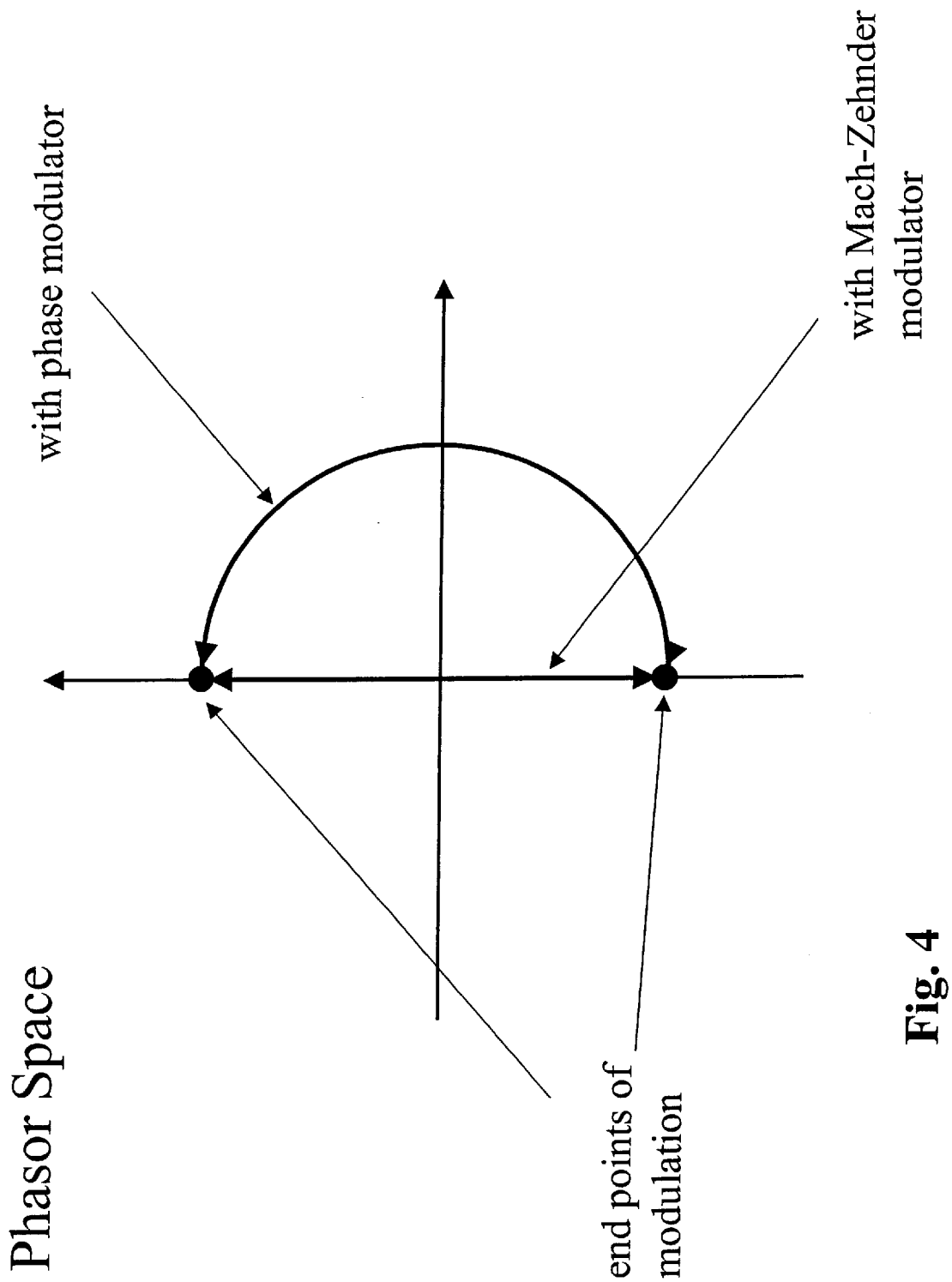
FIG. 4 depicts a signal trajectory in phasor space for modulation in accordance with one embodiment of the present invention in comparison to a signal trajectory in phasor space for conventional phase modulation.

It should be noted that the DB/ID technique provides better chromatic dispersion performance than provided by conventional optical phase modulation. In fact, chromatic dispersion tolerance is improved by approximately a factor of 2. Referring now to FIG. 4, the phase trajectory of a conventional phase modulation signal is compared to that of a DB/ID signal. It can be seen that the DB/ID signal as generated by the Mach-Zehnder modulator, as it traverses its maximum extinction point, does not pass through intermediate phases between the end points of the modulation like the conventionally modulated signals do. It is currently thought that this is the reason for the improved chromatic dispersion performance of the DB/ID signal.

The DB/ID technique also provides 3 dB better receiver sensitivity than IM/DD. The same bit error rate can be achieved with half the optical to signal noise ratio using DB/ID in comparison to IM/DD. For peak OSNR instead of average OSNR, the advantage is even greater, 6 dB, in favor of DB/ID. The additional margin can be used advantageously in several different ways. For example, one could use lower power, lower cost EDFAs for amplification in the system. One could increase the span length without increasing power or one could increase the overall length of the link while keeping the span reach constant. Alternatively, one could increase the number of channels within available bandwidth. As will be explained further below, one could also use the extra margin to ameliorate non-linear effects.

Due to the lower peak to peak modulation voltage of the DB/ID technique, both the slew rate and the maximum required peak to peak output voltage of modulator driver 104 are reduced in comparison to that required by IM/DD. This in turn reduces the peak output power needed from the driver. This feature of DB/ID is particularly advantageous as data rates increase. At a given bit rate, slew rate, and peak to peak voltage of modulator driver 104 may be reduced 40% to 50% as compared to that required by NRZ IM/DD, which results in up to 75% reduction of peak output power. This reduces the cost of the electronics implementing modulator driver 104.

Non-linear effects such as four wave mixing, cross phase modulation, and Raman scattering can be ameliorated in many ways, but most simply by reducing transmitting power. By reducing receiver OSNR requirements, the DB/ID technique allows for transmission at a lower power level which in turn greatly reduces all non-linear effects. Furthermore, simulations have demonstrated even greater resilience to non-linear effects than would be expected, once appropriate distribution of chromatic dispersion compensation is applied throughout the link.

Another advantage is bandwidth efficiency. It is desirable to pack WDM channels together as tightly as possible without exceeding the maximum co-channel interference standards. In comparison to an amplitude modulation technique such as NRZ IM/DD, the DB/ID technique provides 30% to 40% higher bandwidth efficiency.

In an alternative embodiment, the Mach-Zehnder modulator is used as a phase modulator by driving the modulation voltage between $-V_\pi$ and $V_\pi$, the maximum transmission points of the modulator. This technique thus requires a higher modulator voltage, somewhat complicating the design of modulator electronics. Also, spectral side lobes are disadvantageously larger and there is somewhat less tolerance to chromatic dispersion effects.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method of phase modulating an optical signal, said method comprising:
   driving a Mach-Zehnder interferometer with a data signal biased at a level approximately equal to a maximum extinction point of said Mach-Zehnder interferometer; and
   outputting said optical signal, phase modulated by said data signal, from said Mach-Zehnder interferometer.

2. The method of claim 1 further comprising:
   inputting said optical signal to said Mach-Zehnder interferometer by obtaining output from a laser.

3. The method of claim 1 further comprising:
   differentially encoding data carried by said data signal.

4. The method of claim 1 wherein said modulated optical signal has a peak magnitude between approximately 30% and 80% of a maximum output power of said Mach-Zehnder interferometer.

5. The method of claim 4 further comprising:
   inputting said optical signal to said Mach-Zehnder interferometer by obtaining output from a laser.

6. The method of claim 4 further comprising:
   differentially encoding data carried by said data signal.

7. Apparatus for phase modulating an optical signal, said apparatus comprising:
   a Mach-Zehnder interferometer having a modulation drive input; and
   a modulation driver that provides a data signal to said modulation drive input, said data signal being biased to a level approximately equal to a maximum extinction point of said Mach-Zehnder interferometer; and
   whereby said Mach-Zehnder interferometer outputs said optical signal as phase modulated by said data signal.

8. The apparatus of claim 7 further comprising:
   a laser that provides coherent unmodulated optical energy to said Mach-Zehnder interferometer.

9. The apparatus of claim 7 further comprising:
   a differential encoder that differentially encodes data carried by said data signal.

10. The apparatus of claim 7 wherein said modulated optical signal has a peak magnitude between approximately 30% and 80% of a maximum output power of said Mach-Zehnder interferometer.

11. The apparatus of claim 10 further comprising:
    a laser that provides coherent unmodulated optical energy to said Mach-Zehnder interferometer.

12. The apparatus of claim 10 further comprising:
    a differential encoder that differentially encodes data carried by said data signal.

13. Apparatus for phase modulating an optical signal, said apparatus comprising:
    means for driving a Mach-Zehnder interferometer with a data signal biased at a level approximately equal to a maximum extinction point of said Mach-Zehnder interferometer; and
    means for outputting said optical signal phase modulated by said data signal from said Mach-Zehnder interferometer.

14. The apparatus of claim 13 further comprising:
    means for inputting said optical signal to said Mach-Zehnder interferometer by obtaining output from a laser.

15. The apparatus of claim 14 further comprising:
    means for differentially encoding data carried by said data signal.

16. The apparatus of claim 13 wherein said modulated optical signal has a peak magnitude between approximately 30% and 80% of a maximum output power of said Mach-Zehnder interferometer.

17. The apparatus of claim 16 further comprising:
    means for inputting said optical signal to said Mach-Zehnder interferometer by obtaining output from a laser.

18. The apparatus of claim 16 further comprising:
    means for differentially encoding data carried by said data signal.

* * * * *